(12) United States Patent
Miller

(10) Patent No.: US 8,807,619 B2
(45) Date of Patent: Aug. 19, 2014

(54) REMOTE CONTROLLED RESCUE VEHICLE

(75) Inventor: Michael Ray Miller, Apache Junction, AZ (US)

(73) Assignee: Michael Ray Miller, Apache Junction, AZ (US)

( * ) Notice: Subject to any disclaimer, the term of this patent is extended or adjusted under 35 U.S.C. 154(b) by 0 days.

(21) Appl. No.: 13/573,144

(22) Filed: Aug. 24, 2012

(65) Prior Publication Data

US 2014/0054915 A1 Feb. 27, 2014

Related U.S. Application Data

(60) Provisional application No. 61/575,786, filed on Aug. 29, 2011.

(51) Int. Cl.
*A61G 3/00* (2006.01)

(52) U.S. Cl.
USPC .......................................................... 296/19

(58) Field of Classification Search
USPC .............. 296/19, 20; 318/568.1, 568.11, 628, 318/566
See application file for complete search history.

(56) References Cited

U.S. PATENT DOCUMENTS

| | | | | |
|---|---|---|---|---|
| 3,679,081 A | * | 7/1972 | Duncan, Jr. | 414/499 |
| 3,967,716 A | * | 7/1976 | Smith | 198/416 |
| 4,408,739 A | * | 10/1983 | Buchsel | 244/137.1 |
| 4,632,408 A | * | 12/1986 | Olpp et al. | 280/28.14 |
| 4,718,352 A | * | 1/1988 | Theurer et al. | 105/62.1 |
| 4,878,050 A | * | 10/1989 | Kelley | 340/12.54 |
| 5,197,590 A | * | 3/1993 | Prim et al. | 198/300 |
| 5,265,902 A | * | 11/1993 | Lewis | 280/124.102 |
| 5,310,172 A | * | 5/1994 | Prim et al. | 271/150 |
| 5,597,335 A | * | 1/1997 | Woodland | 441/36 |
| 6,095,890 A | * | 8/2000 | George et al. | 446/437 |
| 6,192,542 B1 | * | 2/2001 | Frederick et al. | 15/84 |
| 6,561,339 B1 | * | 5/2003 | Olson et al. | 198/349 |
| 6,612,388 B2 | * | 9/2003 | Henderson | 180/184 |
| 6,892,595 B2 | * | 5/2005 | Inoue et al. | 74/336 B |
| 6,907,982 B2 | * | 6/2005 | Olson et al. | 198/465.1 |
| 7,156,220 B2 | * | 1/2007 | Olson et al. | 198/465.1 |
| 7,464,775 B2 | * | 12/2008 | Clemens et al. | 180/8.3 |
| 7,565,941 B2 | * | 7/2009 | Cunningham | 180/167 |
| 7,896,113 B1 | * | 3/2011 | Ramirez | 180/9 |
| 8,038,504 B1 | * | 10/2011 | Wong | 446/454 |
| 8,474,161 B2 | * | 7/2013 | Cunningham | 37/403 |
| 2004/0016623 A1 | * | 1/2004 | Olson et al. | 198/465.1 |
| 2004/0065242 A1 | * | 4/2004 | Hough et al. | 114/125 |
| 2005/0230222 A1 | * | 10/2005 | Olson et al. | 198/465.1 |
| 2010/0225133 A1 | * | 9/2010 | Ferrara et al. | 294/68.1 |
| 2010/0275472 A1 | * | 11/2010 | Cunningham | 37/403 |

FOREIGN PATENT DOCUMENTS

JP 04121268 A * 4/1992 ............. B61B 13/08

* cited by examiner

*Primary Examiner* — Lori Lyjak

(57) ABSTRACT

The Remote Control Rescue Vehicle is driven by remote control into enemy territory to rescue an injured soldier during battle or in extreme conditions. It can maneuver through very rough terrain and retrieve the soldier with a ramp lowered into position and a conveyer moving backwards through the forward motion of the vehicle will pull the soldier into the vehicle protected by a solid steel armor to be returned safely for triage or surgery.

2 Claims, 6 Drawing Sheets

REMOTE CONTROLLED RESCUE VEHICLE

New Utility Non-Provisional Application from provisional application No. 61/575,786 file date: Aug. 29, 2011.

There is no federally sponsored or research or development associated with this application.

There is no joint research agreement associated with this application.

BACKGROUND OF THE INVENTION (1) Field of the Invention

The "Remote Control Rescue Vehicle" is a new vehicle that has the ability to rescue a soldier after being injured in battle. There is no other vehicle that functions the way this invention does.

(2) Description of the Art Including Information Disclosed Under 37 CFR 1.97 & 1.98

The art described in the drawings of the utility function illustrate the unique ability of the invention to rescue an injured soldier during battle and bring them safely back for triage and surgery.

BRIEF SUMMARY OF THE INVENTION

The "Remote Control Rescue Vehicle" is able to move into enemy territory by remote control and can retrieve a soldier that has been injured by a moving ramp with conveyer belt that operates backwards through the forward motion of the vehicle therefore pulling the body onto the ramp and into the vehicle body that is protected by a solid steel enclosure ensuring the safe return of the injured soldier.

BRIEF DESCRIPTION OF THE SEVERAL VIEWS OF THE DRAWINGS

There are 6 drawings in total that describe and illustrate the design and function of the "Remote Control Rescue Vehicle".

DETAILED DESCRIPTION OF THE PREFERRED EMBODIMENT

Figure 1:
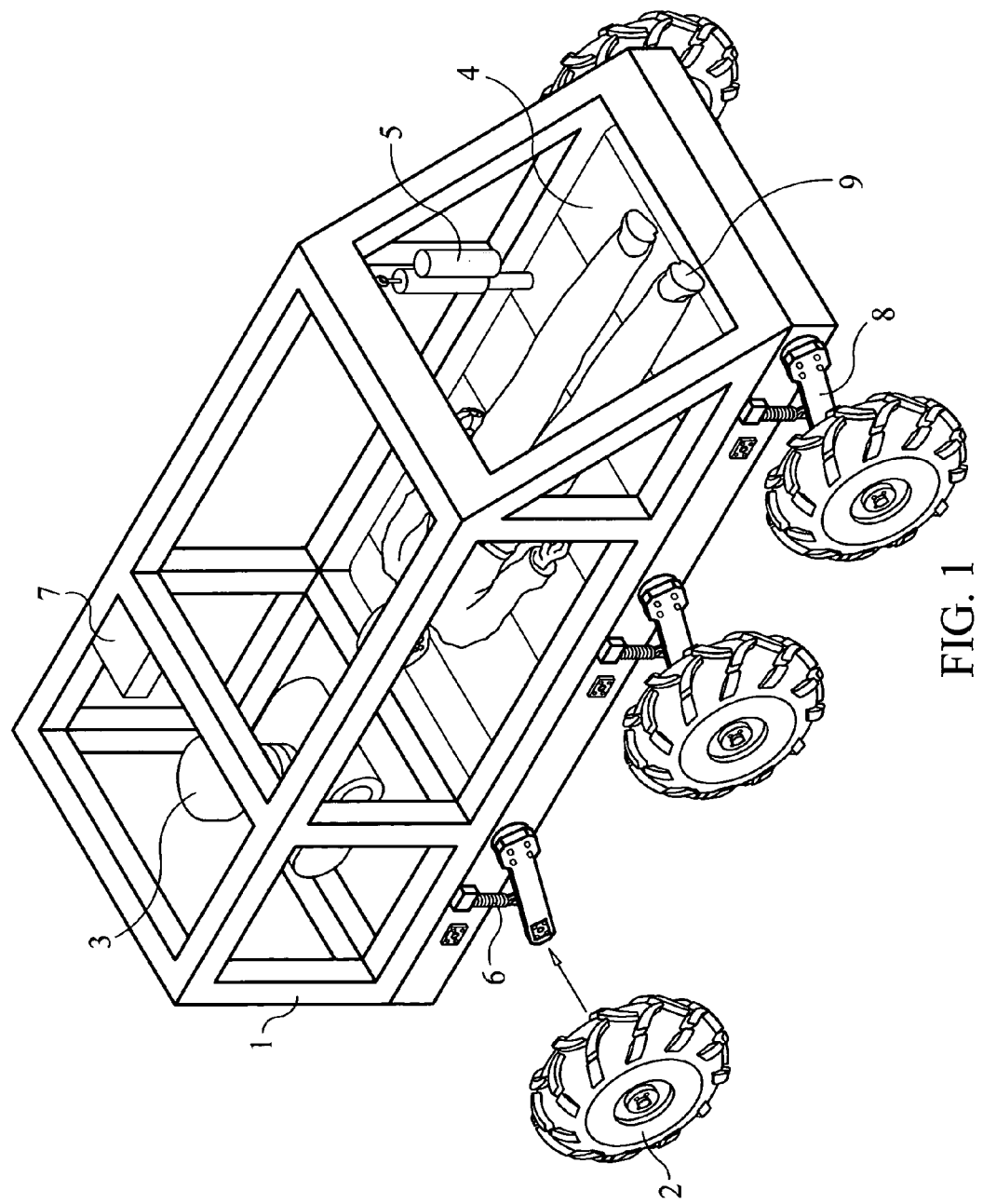
FIG. 1: is the entire vehicle as shown.

FIG. 1: In illustration #1 shows the tubular vehicle frame with the #2 pneumatic tire with #3 the vehicle engine located in the rear of the vehicle with #4 the ramp with the conveyer belt surface with #5 the linear actuator that raises and lowers the ramp with #6 the independent coil over shock with #7 the Remote Control receiver unit with #8 the suspension single action swing arm with #9 the soldiers body inside the vehicle framework lying upon the ramp.

Figure 2:
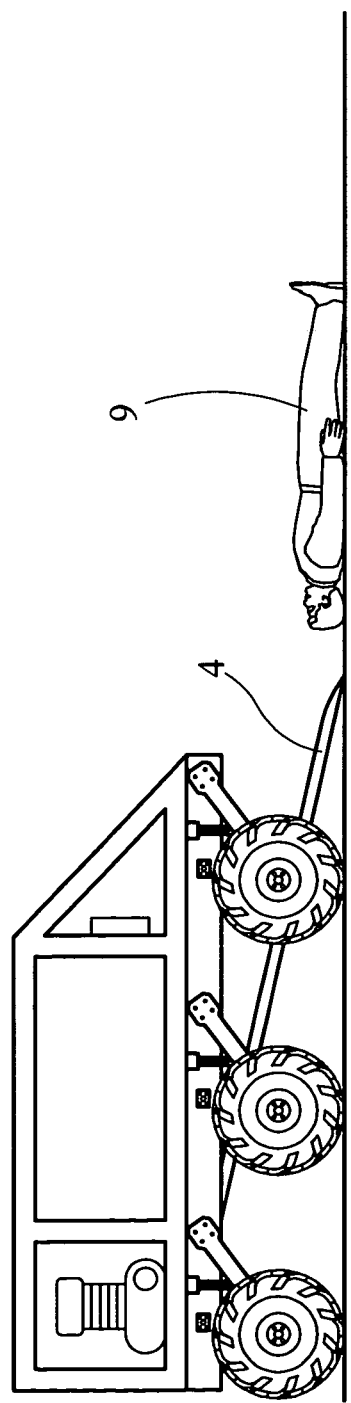
FIG. 2: is the vehicle and soldier down with the ramp in position.

FIG. 2: In this illustration it shows the side view of the vehicle with #4 the conveyer belt ramp in first position to #9 the injured soldier.

Figure 3:
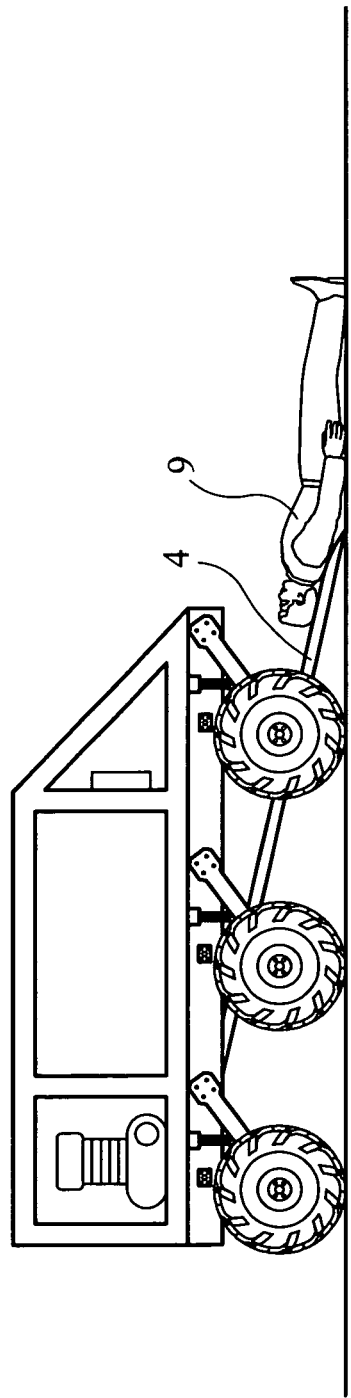
FIG. 3: is the vehicle with the ramp in second position pulling the body onto the ramp.

FIG. 3: In this illustration it shows the side view of the vehicle #4 the conveyer belt ramp pulling the #9 injured soldier onto the ramp.

Figure 4:
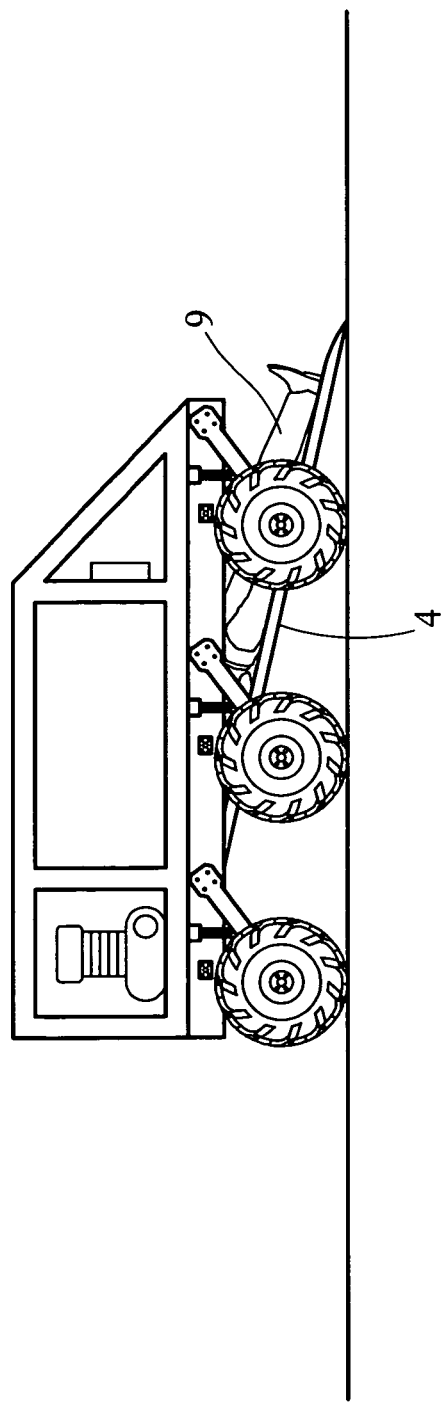
FIG. 4: is the vehicle with the ramp in third position pulling the body into the vehicle.

FIG. 4: In this illustration it shows the side view of the vehicle with #4 the conveyer belt ramp pulling the injured soldier into the vehicle.

Figure 5:
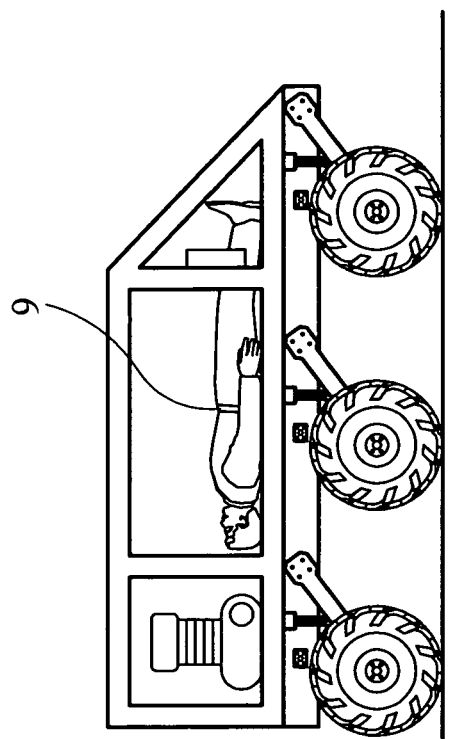
FIG. 5: is the vehicle with the ramp and body fully inside and protected.

FIG. 5: In this illustration it shows the side view of the vehicle with #9 the injured soldier inside the vehicle and now protected to be moved to a safe place.

Figure 6:
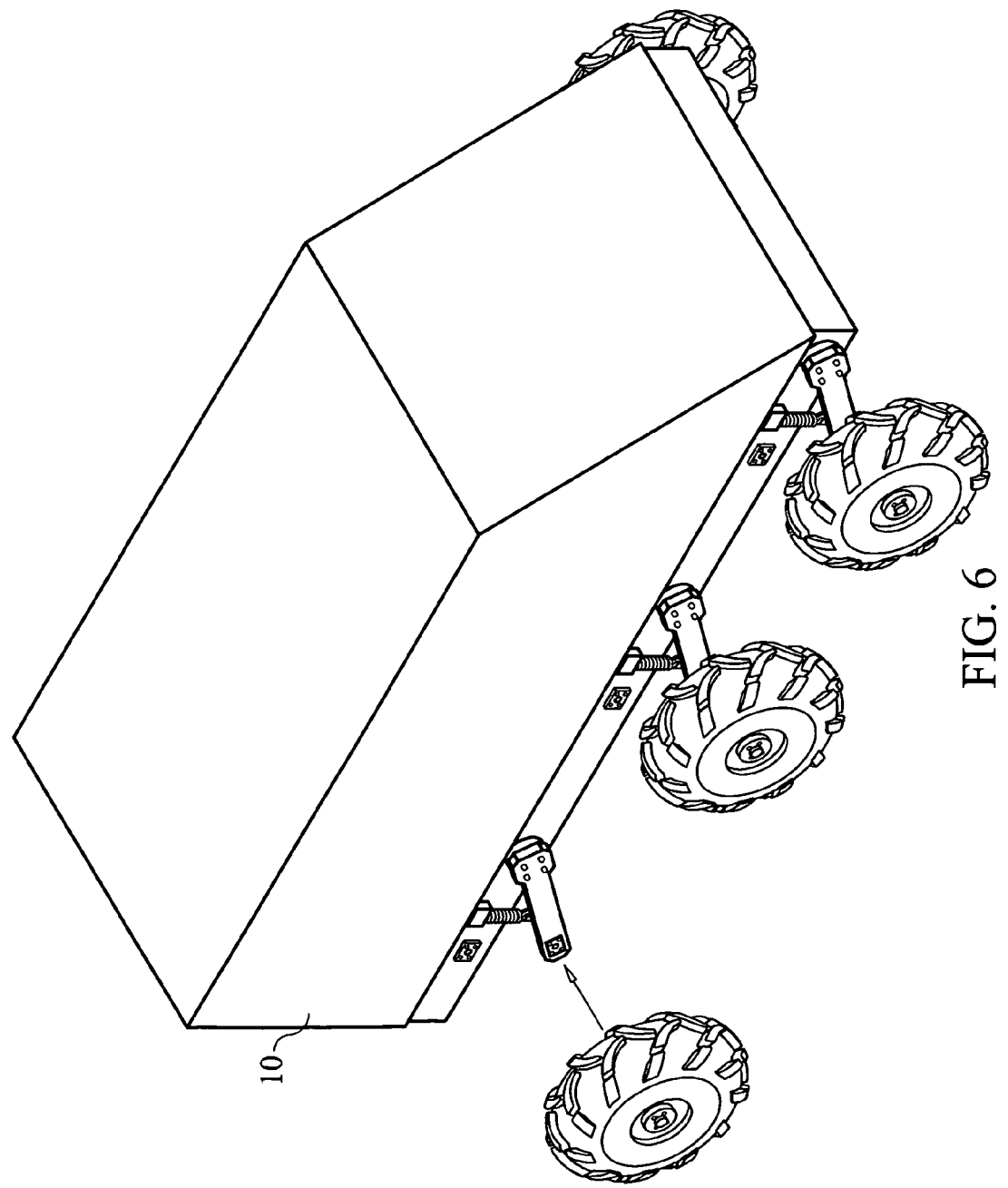
FIG. 6: is the solid steel protective armor protecting the body.

FIG. 6: In this illustration it shows the side angled view of #10 the solid steel protective armor to protect the injured soldier for a safe return.

DETAILED DESCRIPTION OF THE INVENTION

The "Remote Control Rescue Vehicle" is a new and unique design of rescue vehicle for military and commercial uses. It is an all-terrain vehicle to be used in hostile environments and in battle to be used by remote control to enter hostile territory and find an injured soldier or person in a hostile situation. The vehicle is comprised of a light and strong tubular UGV 100 chassis and frame with rectangular tubing suspension swing arms with independent coil over shocks and pneumatic tires to survive the terrain with 30" of suspension travel distance from the ground and to survive possible enemy fire through the rescue process. The engine is a combustion engine with regular gas or diesel and the vehicle uses a dry braking system. The speed of the vehicle can reach 85 MPH. The vehicle contains an adjustable ramp which is lowered or raised inside the vehicle and is comprised of a conveyer belt with rubber padding to remain flexible. The ramp is lowered into position when an injured person or soldier is found and the ramp is moved under the head of the person with the conveyer belt moving backwards while the ramp or vehicle is moving forward to gently pull the person or soldier onto the ramp and pulled inside the vehicle for protection. With the solid steel protective armor surrounding the entire vehicle the person or soldier is totally protected while being moved to a safe place for medical attention. The vehicle can be custom fitted for mine sweeping and many other applications. It is a uniquely designed vehicle that is versatile in its number of uses and is one of the most diverse vehicles of this type for commercial or military use.

I claim:

1. A remote control rescue vehicle comprising: a light weight tubular frame and chassis with a ground clearance of at least 30", a single control arm coil over shock suspension system with pneumatic tires, a dry disk brake system, a combustion engine, a remote control receiver unit, and a conveyer belt ramp comprised of a linear actuator to lower the ramp in front of said remote control rescue vehicle to accommodate pulling an injured person into said remote control rescue vehicle, and a conveyor belt that moves backwards at the same speed as the forward motion of said remote control rescue vehicle to pull the injured person into said remote control rescue vehicle.

2. A remote control rescue vehicle according to claim 1, further comprising a solid steel protective armor covering surrounding the tubular frame for protection of the person being rescued.

* * * * *